United States Patent [19]

Gregorovic

[11] 4,261,538
[45] Apr. 14, 1981

[54] FIXATION DEVICE WITH COLLAR FOR PIPES OR CABLES

[76] Inventor: Dragutin Gregorovic, Quai Marcellis 1, B-4020 Liege, Belgium

[21] Appl. No.: 41,348

[22] Filed: May 22, 1979

[30] Foreign Application Priority Data

May 23, 1978 [BE] Belgium .................................. 867360

[51] Int. Cl.³ ............................................. F16D 15/00
[52] U.S. Cl. ..................................... 248/71; 248/216.1
[58] Field of Search ............. 248/71, 74 R, 300, 216.1, 248/217.3; 85/77

[56] References Cited

U.S. PATENT DOCUMENTS

| | | | |
|---|---|---|---|
| 727,111 | 5/1903 | Duffy | 248/71 UX |
| 1,619,591 | 3/1927 | Voellmecke | 248/72 |
| 2,439,616 | 4/1948 | Wolfe | 248/71 |
| 2,847,177 | 8/1958 | Ronan | 248/216.1 |
| 2,913,204 | 11/1959 | Stewart | 248/71 |
| 3,396,930 | 8/1968 | Gregorovic | 248/71 X |

FOREIGN PATENT DOCUMENTS

| | | | |
|---|---|---|---|
| 256319 | 8/1913 | Fed. Rep. of Germany | 248/71 |
| 339746 | 8/1921 | Fed. Rep. of Germany | 248/71 |
| 515183 | 7/1924 | Fed. Rep. of Germany | 248/71 |
| 235204 | 2/1964 | Netherlands | 248/74 R |
| 26 | of 1914 | United Kingdom | 248/71 |

*Primary Examiner*—J. Franklin Foss
*Attorney, Agent, or Firm*—Robert E. Burns; Emmanuel J. Lobato; Bruce L. Adams

[57] ABSTRACT

An attachment device fabricated from sheet metal and adapted to be driven into a wall includes a penetrating portion which is of a truncated-conical shape having at one end a wall-piercing open tip and at the other end a flat striking surface. A collar-forming portion integral with the penetrating portion extends out beyond the striking surface and has a neck portion and cutout openings to permit bending thereof around the object to be held and a tongue at the free end adapted to be secured to the penetrating portion to maintain the collar in tight holding contact with the object being held.

7 Claims, 8 Drawing Figures

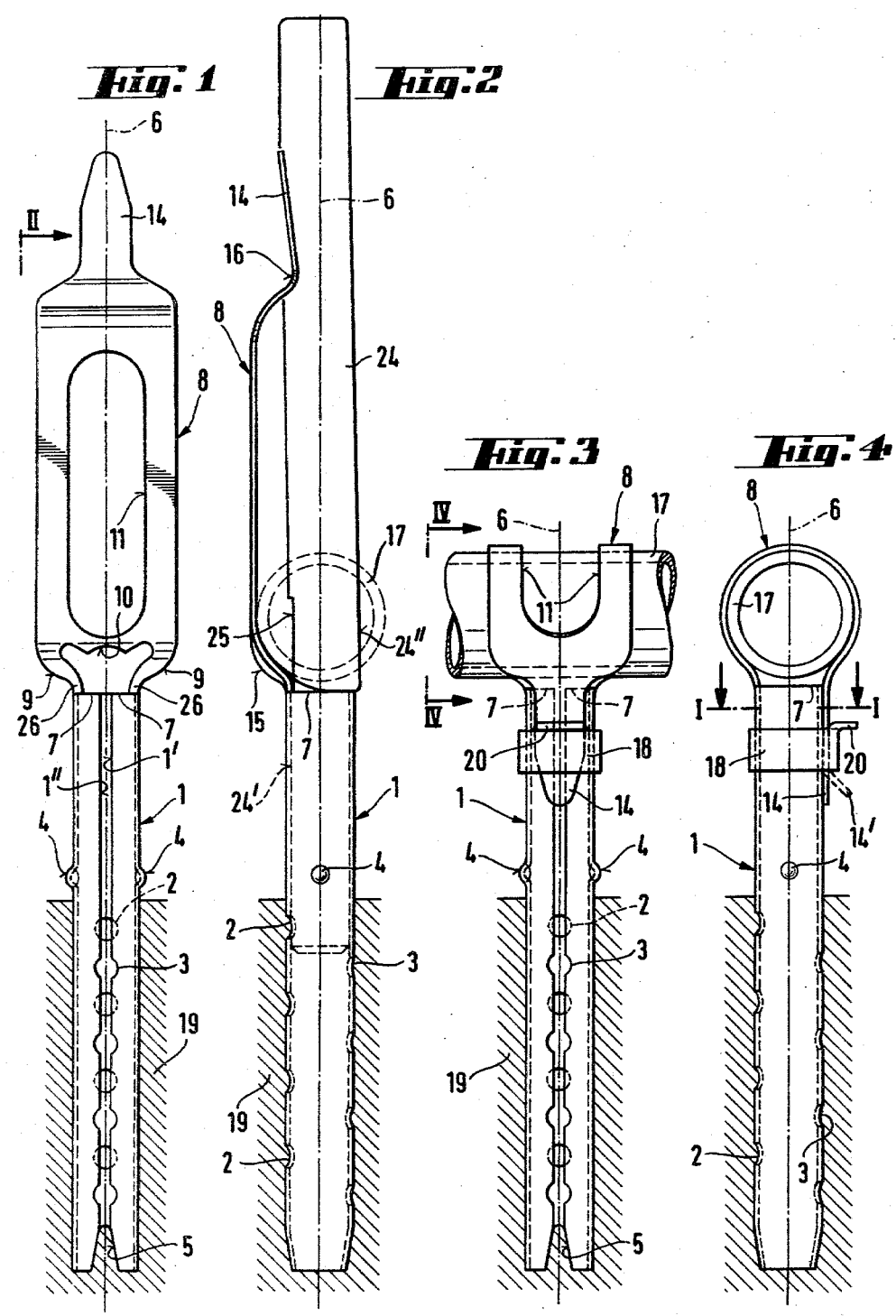

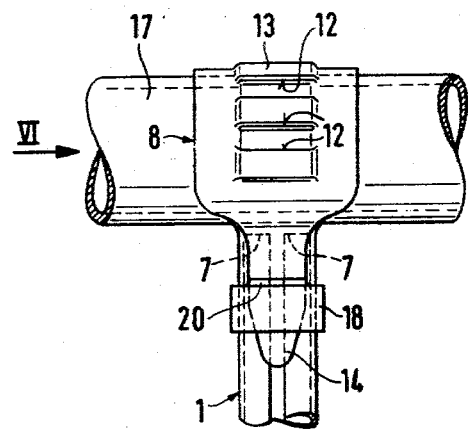
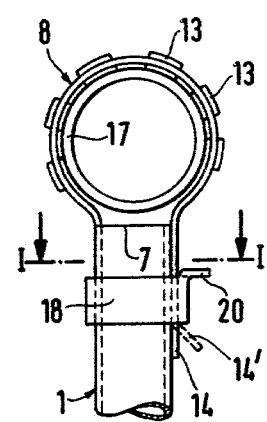
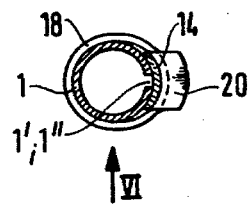
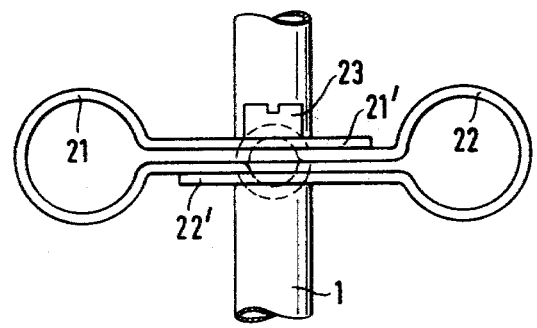

FIXATION DEVICE WITH COLLAR FOR PIPES OR CABLES

FIELD OF INVENTION

The present invention concerns a peg-type device for fixation in a wall or partition, preferably including an exterior part which is continuous with the part introduced into the wall, said exterior part being intended to serve as a support or means of suspension and e.g. as a clamping collar for a pipe or cable. The fixation device is made from strip metal that is cut off, stamped and then simply bent into the desired shape. The device is further remarkable in that it can be introduced forcibly into a wall or partition without necessarily having to drill previously or make a hole exactly of its dimensions.

BACKGROUND OF THE INVENTION

Such suspension devices, of course, are already known, which comprise pieces of strip metal (Belgian Pat. No. 739,876 in the name of the applicant) which are cut, bent and profiled in such a way as to constitute a penetrating part comprising two half profiles bent around a transverse axis and folded back one over the other so as to form a tubular profile. One of the halves of the penetrating part is extended towards the outside by a transverse stamping that can be wrapped around an object to be secured, and receives a small tongue extension of the other half in the penetrating part, and thus constituting a clamping collar.

This kind of device has the drawback that it cannot be made from truly rigid strip metal, in view of the fact that it is necessary to be able to fold one half completely over the other, and that the end of the penetrating part is closed, and finally that the exterior part has no surface perpendicular to the axis of the device against which force can be applied in order to sink the device, so that it can only be placed in a previously drilled hole in the wall or partition.

SUMMARY OF THE INVENTION

The present invention remedies these various disadvantages and at the same time affords advantages of its own. To this end the device is characterized in that it comprises a rectangular metal stub, punched and cut off, its lower part being substantially intended to be introduced into a wall or partition, with roughenings, holes, protuberances and notches along its edges. This stub is at least partially detached by a cut perpendicular to its longitudinal axis over at least half its width from another stub or upper part with which the device is integral, the part below this cut being folded back along its longitudinal axis so as to form a substantially straight, truncated-cone-shaped part open both at its end which is to be sunk and open over its entire length, the longitudinal edges being simply brought close together, whilst the other end, the transverse edge of the cutting, presents a straight plane perpendicular to the axis of the stub, on which plane it is possible to hammer directly or with the interposition of a dolly.

Preferably the cut perpendicular to the longitudinal axis is only partial and an upper part of the stub is retained, which upper part will just be cut off, perforated or notched so that it may be folded more easily along an axis transverse to the truncated-cone part, so as to form a clamping collar for a pipe or cable. In order to be able to tighten this collar the end of the upper part of the stub is cut in such a way as to form a tongue capable of being grasped by a retaining ring that is slid or passed over the truncated-cone part of the stub.

BRIEF DESCRIPTION OF DRAWING

So that the invention may be better understood and its other advantages and characteristics revealed, a non-limiting example will now be described with reference to the accompanying drawing in which:

FIG. 1 is a front elevation of an open device according to the invention, placed in a wall shown in section;

FIG. 2 is a side elevation of the same device as in FIG. 1, and, schematically, a dolly and a pipe coming to rest on the device placed in a wall shown in section;

FIG. 3 a view of the same device as in FIG. 1, but this time in closed position, holding a pipe, the device being placed in a wall shown in section;

FIG. 4 is a side elevation of the device of FIG. 3 in the same position;

FIG. 5 is a partial front view of a variant embodiment of the upper part of the device;

FIG. 6 is a side elevation of the device of FIG. 5;

FIG. 7 is a partial front elevation of a device according to the invention joined to a support with a double clamping ring;

FIG. 8 is a cross sectional view taken on the line I—I of FIG. 4 and/or FIG. 6.

DESCRIPTION OF PREFERRED EMBODIMENT

Referring in particular to FIGS. 1 to 4, we see the penetrating truncated-conical part of the device 1 which can, indeed, constitute the device by itself and as such can act in a known manner to support or secure another independent element.

This truncated-conical part 1 contains holes 2, notches 3, protuberances 4 and end nicks 5 which are of known type, generally produced before the rectangular strip-metal stub from which the truncated-conical part 1 is made has been folded along its longitudinal axis 6, likewise a horizontal cut which forms the straight horizontal edge 7 at the end of truncated-conical part 1, i.e. a cut and an edge 7 perpendicular to the longitudinal axis 6 of the part 1 is produced before the part 1 is bent.

As represented in FIG. 1 to 6, the horizontal cut is partial and an upper part 8 is retained. This upper part 8 has the same width as the truncated-conical part 1 before the latter has been folded, i.e. when it was flat. So as to be able to have it make a circle around a pipe, it has been partially cut out at one end to produce a narrower part at the place 26 where it joins onto truncated-conical part 1. Two rounded edges 9 are provided and, optionally, a wide interior cut-out 10. Then over a substantial part of its length it is pierced by a wide and long median transversal opening 11 (FIGS. 1 and 3), or alternatively a row of transverse staggered slots 12 is provided, (FIG. 5) forming laminae 13, which preferably will be pushed outwards (FIG. 6) so as to permit the formation of an anti-noise clamping collar.

In addition, this upper part 8 terminates in a cut-out part in the form of a tongue 14.

In order to facilitate the implementation of the collar thus formed by this upper part, curves 15 and 16 are provided by stamping (FIG. 2). As seen in FIG. 2, tongue 14 is preferably bent slightly back away from longitudinal axis 6 of the apparatus. When the collar, i.e. upper part 8 clamps a pipe 17, it is necessary to retain tongue 14 against the end of truncated-conical part 1. For this purpose a ring 18, either a closed one which is slid along truncated-conical part 1 before it is introduced into a wall 19, or an open one which is placed open over truncated conical part 1, is provided in order to make it clamp this part 1. This ring 18 is also placed over tongue 14 which is preferably bent outwards in position 14' in order to ensure clamping of the pipe. In addition, ring 18 preferably provides for a stop 20 placed horizontally which will enable ring 18 to be slid down again more easily over the truncated-conical part 1, after, of course, it has been made to clamp the latter and tongue 14 in such a way as to force this tongue downwards, especially if it has been brought into position 14' and thus obtain maximum clamping of pipes 17.

As already indicated, in order to deaden sound, laminae 13 may be pushed out. It is also possible at the same time, or only, to coat the strip-metal stump on the surface which is to become the inside surface with a layer of plastic having the effect of deadening sound. Of course, the coating may be only on upper part 8.

Referring to FIG. 7, the apparatus is limited to truncated-conical part 1, and joined to it is a stump of strip metal formed into a double collar 21, 22 held in the centre by a bolt 23 engaging in a nut (not shown) held inside the truncated-conical part. If each of the return parts 21' and 22' of the collar held by bolt 23 is provided with an oblong hole (not shown), it is possible more or less to adjust the tightness of the pipe clamping.

If, technically, the apparatus represented in FIGS. 1 to 6, and which has an upper part in one piece with the truncated-conical part, is particularly remarkable in that while in use it is adjustable without the need to employ either screws or nuts and hence without having to use either a screw-driver or wrench, moreover, and this will also be the case for the apparatus represented in FIG. 7, it can be driven forcibly into a wall or partition (i.e. without having to drill a hole beforehand and nevertheless having to provide means of sealing).

In fact, at the exterior end of the truncated-conical part 1 the device has a straight plane 7 which can be used either directly for hammering on or on which to take support with the intervention of a dolly 24 (represented schematically in FIG. 2)—a long straight stem comprising a part 24' of diameter slightly less than the inside diameter of truncated-conical part 1, then a part 24" at least equal to, but preferably slightly bigger than the outside diameter of truncated-conical part 1, part 24" being provided with a cut-away 25, a segment of diameter slightly greater than the common part 26 between truncated-conical part 1 and upper part 2.

It will be easily realized that with a dolly 24 so designed, it is entirely possible to drive the device into wall 19 forcibly with the aid of a hammer.

Preferably dolly 24 is either provided with a small projection (not shown) on its part 24' that projects into truncated-conical part 1 and which will serve as a guide for the insertion of dolly 24 by situating itself in the gap between edges 1' and 1" of truncated-conical part 1 in such a way that cut-away part 25 of dolly 24 is kept in place. In addition this projection will, if required, enable the device already in place in the wall 19 to be turned.

It should be noted that normally the device is intended to be sunk in wall 19 by means of dolly 24 before closing (folding), even provisionally, the clamping collar, upper part 8. However, if median opening 11 (FIGS. 1 and 3) is long enough and wide enough it will not prevent the introduction of dolly 24, although this would not be true of a device with an upper part 8 of the kind represented in FIGS. 5 and 6.

The invention is not restricted to the embodiments described and represented. In fact it is possible to give truncated-conical part 1 a cross-sectional profile other than circular, for example, square, triangular, hexagonal, and it is possible furthermore to join the device limited to a truncated-conical part to other elements of suspensions, supports, etc . . . .

Preferably, the device will be produced by the following shaping process: a ribbon of strip metal the width of which is slightly greater than the final length of the desired device or the sum of the lengths in the case where several devices are being produced at the same time, is uncoiled from a reel and forced to pass through a press, so that in succession, as it advances, firstly, it is punched so as to cut at one of its borders an edge the length of which at one end will be equivalent to the width of the stump of strip metal which it is desired to obtain, which edge width determines the feed pitch of the ribbon of strip metal, and an edge at the other end the width of which is less than the total border which it is finally necessary to cut out in order to arrive at the desired stump of strip metal in such a way as to retain a small border;

secondly, it is punched in order to provide in it the longitudinal perforations of the strip-metal stump as well as its lateral cuts, taking care, however, to retain on either side of the ribbon of strip metal a small border and a number of small tongues attaching the strip-metal stump to these borders and the strip-metal stumps to each other in the case where several stumps are being provided in the direction of the width of the ribbon of strip metal;

thirdly, the longitudinal cutting of the stump or stumps of strip metal is carried out, retaining the borders;

fourthly, one forward feed step is made;

fifthly, the desired camber is given;

sixthly, the small tongues are removed and the ribbon of strip metal is folded by pushing the stump or stumps by their longitudinal central axis through a bed which flares outwards from top to bottom and ends in a hole corresponding exactly to the final diameter of the desired items. These items are removed through the said hole.

For the implementation of this process it is intended to use a die press receiving a flat ribbon of strip metal advancing from an automatic uncoiler of a strip-metal reel, or other apparatus capable of bringing and feeding a strip-metal ribbon in a regular manner. The press and uncoiler or the apparatus feeding the ribbon of strip metal can function automatically and their automatic stoppage in the case of a malfunction revealed, e.g., by a photoelectric system, can be provided for.

The power of the press will depend on the width of the ribbon of strip metal and presses of 30 to 70 [metric] tons, for example, are foreseen. This press is designed to receive special tooling which can be modified depending on the desired dimensions of the items it is desired to manufacture.

It may be noted that it is not a question here of a special press but simply of the provision of a special die which, together with a set of dies, makes it possible to produce at a rate, for a press of 50 [metric] tons, of 3,500 pieces per hour, items such as the device which is the subject of the present patent, but also other, every-day products such as forks, knives, spoons.

I claim:

1. Device for fixation in a wall for supporting a pipe, cable or other object, said device comprising a sheet metal stamping having a lower part intended to be introduced in said wall and an integral upper part intended to support said object, said lower part being generally rectangular and being folded along its longitudinal axis in such a way as to form a truncated-conical part which is substantially straight, open both at its end intended to be introduced into the wall and over its whole length, the longitudinal edges being simply brought close to each other, said upper part being cut, pierced and notched so that it can easily be bent around an axis transverse to said truncated-conical part in such a way as to form a collar for receiving and supporting said object, said upper part being partially detached from said lower part by a cut which extends over at least half the width of said lower part and is perpendicular to its longitudinal axis to present a plane surface on which it is possible to hammer to drive said lower part into said wall.

2. Fixation device according to claim 1, in which said lower part is provided with roughenings, holes and protuberances and with notches along its edges to increase the holding power of said device.

3. Fixation device according to claim 1, in which the upper part is provided with a wide interior cut-out at the place where it joins the truncated-conical part and terminates in a part cut in the form of a tongue capable of being grasped by a clamping ring slid or passed over the upper end of the truncated-conical part in such a way as to ensure clamping of said collar around said object.

4. Fixation device according to claim 3, in which the upper part is pierced by a long and wide median transverse hole.

5. Fixation device according to claim 1, in which the upper part is pierced by a row of transverse, staggered slots forming laminae which are preferably pushed outwards and terminates in a part cut in the form of a tongue capable of being grasped by a clamping ring slid or passed over the upper end of the truncated-conical part in such a way as to ensure clamping of said collar around said object.

6. Fixation device according to any of claims 3, 4 and 5, in which the clamping ring is slid or passed over the end of the truncated-conical part is closed or open and furnished with a horizontal stop permitting the ring to be lowered in such a way as to increase the clamping pressure of the collar around a pipe.

7. Fixation device according to any of claims 1 and 3 to 5, in which the transverse edge of the cut separating the lower part partially from the upper part and presenting a straight plane, is used to place thereon and support a dolly one part of which may penetrate into the truncated-conical part, said dolly part being preferably fitted with a small projection which can penetrate the longitudinal edges of said truncated-conical part in such a way as to guide the dolly, hold it in place and, optionally, permit the device to be turned.

* * * * *